US009644403B2

(12) United States Patent
Lange et al.

(10) Patent No.: US 9,644,403 B2
(45) Date of Patent: May 9, 2017

(54) SYSTEM FOR CONTROLLING LOCKING MODULE FOR VEHICLE DOOR

(71) Applicant: GM GLOBAL TECHNOLOGY OPERATIONS LLC, Detroit, MI (US)

(72) Inventors: Richard J. Lange, Troy, MI (US); Phillip C. Storck, III, Chesterfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 496 days.

(21) Appl. No.: 13/654,469

(22) Filed: Oct. 18, 2012

(65) Prior Publication Data

US 2014/0110952 A1 Apr. 24, 2014

(51) Int. Cl.

| | |
|---|---|
| ***B60T 8/60*** | (2006.01) |
| ***E05B 81/14*** | (2014.01) |
| ***E05B 81/76*** | (2014.01) |
| ***E05B 77/12*** | (2014.01) |
| ***E05B 77/54*** | (2014.01) |
| ***E05B 81/06*** | (2014.01) |
| ***E05B 81/34*** | (2014.01) |

(52) U.S. Cl.

CPC .............. *E05B 81/14* (2013.01); *E05B 77/12* (2013.01); *E05B 77/54* (2013.01); *E05B 81/06* (2013.01); *E05B 81/34* (2013.01); *E05B 81/76* (2013.01); *Y10T 292/0936* (2015.04)

(58) Field of Classification Search

CPC ........... E05B 77/12; E05B 77/54; E05B 81/06
USPC .......... 292/129; 701/36, 45; 340/5.72, 425.5
See application file for complete search history.

(56) References Cited

U.S. PATENT DOCUMENTS 4,858,971 A 8/1989 Haag et al.
5,111,902 A 5/1992 Sundeen et al.
6,445,287 B1 * 9/2002 Schofield et al. ............ 340/442
7,229,139 B2 * 6/2007 Lu ......................... B60T 8/1755 180/204
2003/0137195 A1 7/2003 Suzuki
2003/0222787 A1 12/2003 Shimamoto et al.
2005/0236894 A1 * 10/2005 Lu ......................... B60T 8/1755 303/139

(Continued)

FOREIGN PATENT DOCUMENTS

CN 101051399 A 10/2007
EP 1953051 A2 8/2009

*Primary Examiner* — Kristina Fulton
*Assistant Examiner* — Thomas Neubauer
(74) *Attorney, Agent, or Firm* — Quinn IP Law

(57) ABSTRACT

A system for controlling a locking module for a vehicle door having an electronic latch mechanism is provided. An electronic handle switch is operatively connected to the door and a controller. The electronic handle switch is configured to at least partially control operation of the electronic latch mechanism. The locking module is configured to block the electronic handle switch, thereby preventing the door from being unlatched. The locking module is enabled when one or more predefined operating parameters are met. The controller disables the locking module when one or more entry conditions are satisfied. At least one sensor is operatively connected to the controller, the sensor being configured to indicate one of two states, a first state and a second state. The entry conditions include at least one sensor indicating the second state.

15 Claims, 2 Drawing Sheets

(56) References Cited

U.S. PATENT DOCUMENTS

| | | | | |
|---|---|---|---|---|
| 2010/0007463 | A1 * | 1/2010 | Dingman et al. | 340/5.72 |
| 2010/0052337 | A1 * | 3/2010 | Arabia et al. | 292/216 |

* cited by examiner

SYSTEM FOR CONTROLLING LOCKING MODULE FOR VEHICLE DOOR

TECHNICAL FIELD

The disclosure relates generally to a system for controlling a locking module for a vehicle door.

BACKGROUND

The latching systems of automobiles have undergone numerous changes over the years. Some of the current latching systems have been redesigned with electronic switches to replace interior and exterior latch handle assemblies, which were previously formed of numerous mechanical parts. The electronic latching systems require control modules to ensure optimal usage.

SUMMARY

A system for controlling a locking module for a vehicle door having an electronic latch mechanism is provided. An electronic handle switch is operatively connected to the door and a controller. The electronic handle switch is configured to control operation of the electronic latch mechanism based at least partially on an activation of the electronic handle switch. The locking module may be configured to block the electronic handle switch, thereby preventing the door from being unlatched. The locking module prevents inadvertent door openings under certain circumstances, for example when the vehicle is in motion. The operation of the locking module is enhanced when the locking module is disabled under certain circumstances. More specifically, the controller disables or "turns off" the locking module when one or more entry conditions are satisfied.

One or more sensors (at least one sensor) may be operatively connected to the controller. The sensors are configured to indicate one of at least two states, such as a first state and a second state. The at least one sensor may include an airbag sensor operatively connected to the controller and an airbag. The airbag sensor is configured to indicate a first airbag state when the airbag is not deployed and a second airbag state when the airbag is deployed. The entry conditions may include the airbag sensor indicating the second airbag position.

The sensors may include a rollover sensor configured to indicate a first roll position when the vehicle is substantially un-rotated and a second roll position when the vehicle has rotated beyond a threshold angle. The entry conditions may include the rollover sensor indicating the second roll position.

The sensors may include a suspension sensor configured to indicate a first suspension state when the vehicle is in a typical load state and a second suspension state when the vehicle is in a non-typical load state. An example of a non-typical load state may be when the vehicle has at least partially rolled over. The suspension sensor may be configured to indicate a first suspension state when a vertical displacement of the vehicle suspension system is below a threshold displacement and a second suspension state when the vertical displacement is above the threshold displacement. The entry conditions may include the suspension sensor indicating the second suspension state.

The sensors may include a navigation sensor configured to indicate a first navigation state if the vehicle has moved greater than a threshold distance in a predefined time and a second navigation state if the vehicle has moved less than or equal to the threshold distance in the predefined time. The entry conditions may include the navigation sensor indicating the second navigation state.

The sensors may include a speed sensor operatively connected to the controller, the speed sensor being configured to indicate a first speed state when the vehicle is moving above a threshold speed and a second speed state when the vehicle is moving below the threshold speed. The entry conditions may include the speed sensor indicating the second speed state.

The sensors may include an ignition sensor operatively connected to the controller and to a vehicle ignition, the ignition sensor being configured to indicate a first ignition state when the ignition is on and a second ignition state when the ignition is off. The entry conditions may include the ignition sensor indicating the second ignition state.

The sensors may include a transmission sensor operatively connected to the controller and to a vehicle transmission, the transmission sensor being configured to indicate a first transmission state when the transmission is not in park and a second transmission state when the transmission is in park. The entry conditions may include the transmission sensor indicating the second transmission state.

The locking module is enabled when one or more predefined operating parameters are met. The predefined operating parameters may include the speed sensor indicating the first speed state or the ignition sensor indicating the first ignition state or the transmission sensor indicating the first transmission state.

The door may include a door lock switch operatively connected to the controller and configured to control operation of the electronic latch mechanism based at least partially on an activation of the door lock switch. The locking module may also be configured to block the door lock switch, thereby preventing the door from being locked or unlocked.

The above features and advantages and other features and advantages of the present invention are readily apparent from the following detailed description of the best modes for carrying out the invention when taken in connection with the accompanying drawings.

DETAILED DESCRIPTION

Figure 1:
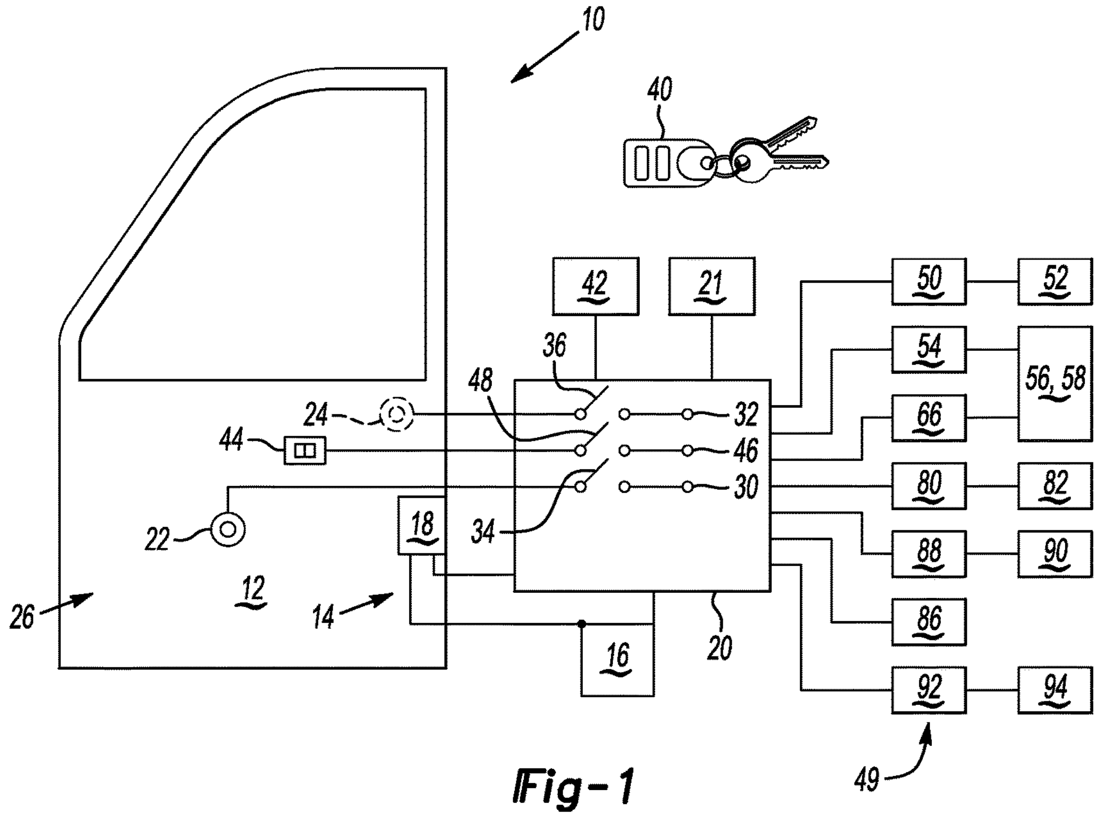
FIG. 1 is a schematic illustration of a vehicle having a door with an electronic latch mechanism and a controller, the controller using an algorithm as set forth herein to control a locking module for the electronic latch mechanism.
Figure 5:
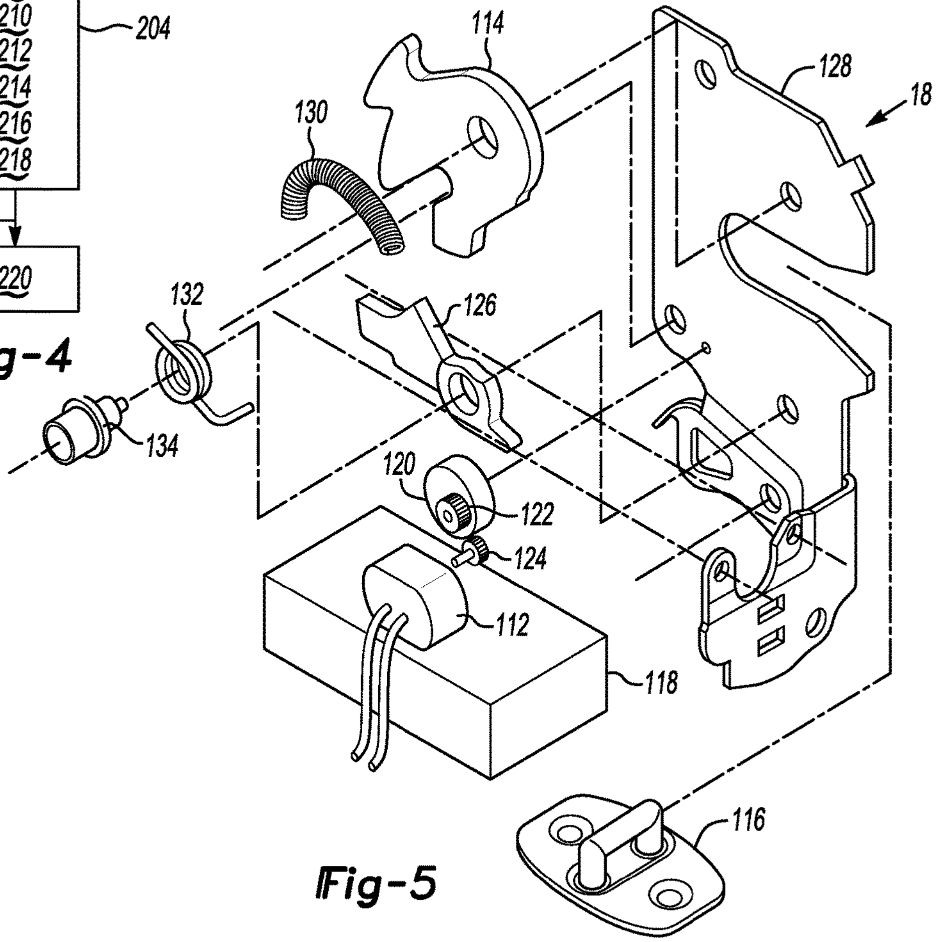
FIG. 5 is an exploded view of one example of a latch assembly that may be employed in the electronic latch mechanism of FIG. 1.

Referring to the drawings, wherein like reference numbers correspond to like or similar components throughout the several figures, a vehicle 10 having a door 12 is shown in FIG. 1. The vehicle 10 includes an electronic latch mechanism 14. Referring to FIG. 1, the latch mechanism 14 includes a power source 16 and a latch assembly 18 that is operatively connected to the power source 16. Any suitable type of latch assembly 18 may be employed. One example of a latch assembly 18 that may be employed in the electronic latch mechanism 14 is illustrated in FIG. 5 and described below. Referring to FIG. 1, the vehicle 10 includes a control system having a controller 20 operatively connected to the latch mechanism 14. The controller 20 may include control units (such as a body control unit) configured to control the latch mechanism 14, other body assemblies or other vehicle functions.

Referring to FIG. 1, first and second electronic handle switches 22, 24 are operatively connected to the controller and configured to control operation of the latch mechanism 14 based at least partially on activation of the respective electronic handle switches 22, 24. The first electronic handle switch 22 may be mounted to the interior side 26 of the door. The second electronic handle switch 24 (shown in phantom) may be mounted to the exterior side (not shown) of the door. The first and second electronic handle switches 22, 24 may be operatively connected to input nodes 30, 32 of the controller 20 through first and second connecting switches 34, 36, respectively. The first and second connecting switches 34, 36 may be any type of switch or device known to those skilled in the art that enable the making and breaking of the respective connections between the first and second electronic handle switches 22, 24 and the input nodes 30, 32.

The controller 20 may be configured to identify and evaluate a request to change the state of the electronic latch mechanism 14, such as a request to change the state of the electronic latch mechanism 14 from a closed door configuration to an open door configuration. The request to change the state of electronic latch mechanism 14 may come from multiple sources, such as the first and second electronic handle switches 22, 24. Referring to FIG. 1, other sources may include a wireless switch, such as a key fob switch 40 configured to wirelessly transmit the request signal, and a child safety switch 42 that may be mounted to a portion of the vehicle 10 adjacent to the driver's seat (not shown).

Referring to FIG. 1, a door lock switch 44 may be operatively connected to the controller 20 and configured to control operation of the electronic latch mechanism 14 based at least partially on activation of the door lock switch 44. The door lock switch 44 may be operatively connected to the input node 46 of the controller 20 through a third connecting switch 48.

Referring to FIG. 1, one or more sensors 49 may be operatively connected to the controller 20. While the sensors 49 are shown separately from the controller 20 for illustrative purposes, some or all of the sensors 49 may be embodied as units within the controller 20 and still considered to be operatively connected to the controller 20. The sensors 49 may be configured to indicate one of at least two states. For example, the sensors 49 may indicate a first vehicle state when the vehicle 10 is in a typical condition and a second vehicle state when the vehicle 10 is in a non-typical condition. A non-typical condition may be where the vehicle 10 has rolled over, is stuck in a ditch or involved in some type of collision or impact event. Each of the sensors 49 described below may include more than two states.

Referring to FIG. 1, one of the sensors 49 may include an airbag sensor 50 that is operatively connected to the controller 20 and at least one airbag 52 in the vehicle 10. The airbag sensor 50 is configured to indicate a first airbag state when the airbag 52 is not deployed and a second airbag state when the airbag 52 is deployed.

Figure 2:
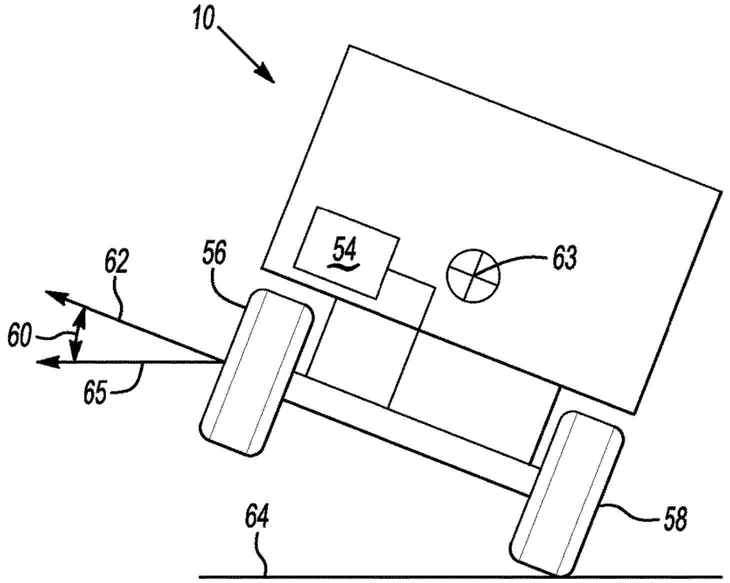
FIG. 2 is a schematic illustration of one example of a rollover sensor that may be employed in the vehicle of FIG. 1.

Referring to FIG. 1, one of the sensors 49 may include a rollover sensor 54 operatively connected to the controller 20 and wheels 56, 58 of the vehicle 10. FIG. 2 is a schematic illustration of one example of a rollover sensor 54 that may be employed in the vehicle 10. Referring to FIG. 2, the wheels 56, 58 define an angle 60 between a wheel axis 62 and an axis 65 that is substantially parallel to the ground 64. The rollover sensor 54 is configured to indicate a first roll position when the angle 60 is zero, in other words, the vehicle 10 is substantially un-rotated and both the wheels 56, 58 are on the ground 64. The rollover sensor 54 is configured to indicate a second roll position when the angle 60 is above a threshold angle and at least one of the wheels 56, 58 is off the ground 64. In one example, the threshold angle is approximately 10 degrees. In another example, the threshold angle is approximately 15 degrees. The threshold angle may be selected with respect to the particular application at hand.

Referring to FIG. 1, the rollover sensor 54 may be configured to output a signal to the controller 20, which may include other devices for filtering and processing the signal. The rollover sensor 54 may employ semiconductor technology. Referring to FIG. 2, the rollover sensor 54 may be configured to sense the angular position as well as the angular velocity or roll-rate of the vehicle 10. An example of a rollover sensor 54 is the GYROCHIP™ industrial solid state rotation sensor, which is commercially available from BE1 Sensors and Systems Co. of Concord, Calif. The GYROCHIP™ sensor uses the Coriolis Effect to produce an output signal having a voltage proportional to the rate of rotation, including magnitude and angular direction, about an axis of sensitivity of the rollover sensor 54. The angular position of the vehicle 10 may be derived from the angular velocity of the vehicle 10. Referring to FIG. 2, the axis of sensitivity of the rollover sensor 54 may be coaxial with the front-to-rear axis 63 (out the page) of the vehicle 12 through the center of the vehicle 10.

Figure 3:
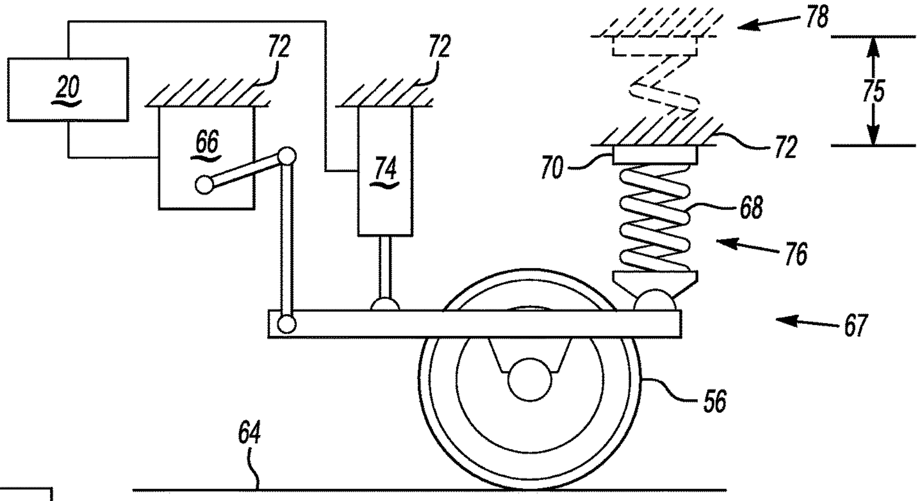
FIG. 3 is a schematic illustration of one example of a suspension sensor that may be employed in the vehicle of FIG. 1.

Referring to FIG. 1, one of the sensors 49 may include a suspension sensor 66 operatively connected to the controller 20 and wheels 56, 58 of the vehicle 10. FIG. 3 is a schematic illustration of one example of a suspension sensor 66 that may be employed in the vehicle 10 with a suspension system 67. The suspension system 67 shown in FIG. 3 is intended as a non-limiting example. Any suitable type of suspension system 67 and sensor 66 known to those skilled in the art may be employed. Referring to FIG. 3, the suspension system 67 may include a spring 68 having a spring seat 70 that is operatively connected to vehicle body/frame 72. A damping portion 74 may be operatively connected to vehicle body/frame 72. The damping portion 74 and spring 68 may be disposed in parallel between the vehicle body/frame 72 and the tire/wheel 56 (or 58). Any other suitable geometric configuration may be employed.

Referring to FIG. 3, the suspension sensor 66 is configured to sense the suspension deflection of the vehicle 10, that is, the vertical displacement 75 and/or vertical velocity of the wheel 56 (or 58) relative to the vehicle body/frame 72. The suspension sensor 66 is configured to indicate a first suspension state 76 when the vehicle 10 is in a typical load state and a second suspension state 78 (shown in phantom) when the vehicle 10 is in a non-typical load state. An example of a non-typical load state may be when the vehicle 10 has at least partially rolled over. In the embodiment shown, the suspension sensor 66 is configured to indicate a first suspension state 76 when the vertical displacement 75 of the suspension system 67 is below a threshold displacement and a second suspension state 78 (shown in phantom) when the vertical displacement 75 of the suspension system 67 is above the threshold displacement. The threshold displacement may be defined according to the particular application at hand. In one example, the threshold load is approximately half the typical weight of the vehicle 10 in an upright, non-rolled over state. For example the threshold load may be 1500 pounds in a vehicle 10 with a weight of 3000 pounds in a typical load state. The suspension sensor 66 may be configured to indicate the second suspension state 78 only if the non-typical load state is maintained for a minimum period, for example at least 5 seconds.

Referring to FIG. 1, one of the sensors 49 may include a navigation sensor 80 operatively connected to the controller 20 and to a navigation device 82. The navigation device 82 may be a global positioning satellite (GPS), a land-based system or a combination of both. Any combination of navigation devices known to those skilled in the art may be employed.

The navigation device 82 is configured to indicate the position of the vehicle 10 at a specific time, e.g., a first position at a first time and a second position at a second time. A moving distance of the vehicle is defined as and determined by the difference between the first and second positions. The navigation sensor 80 of FIG. 1 uses this data to determine whether the vehicle 10 is in one of at least two states. The navigation sensor 80 of FIG. 1 is configured to indicate a first navigation state if the vehicle 10 has moved greater than a threshold distance in a predefined time and a second navigation state if the vehicle 10 has moved less than or equal to the predefined distance in the predefined time. The threshold distance and predefined time may be set according to the particular application. For example, if the threshold distance is set as 10 feet and the predefined time is set at 10 seconds, the navigation sensor 80 will indicate the first navigation state if the vehicle 10 has moved 10 feet or more in 10 seconds and the second navigation state if the vehicle 10 has moved less than 10 feet in 10 seconds. In one example, the margin of error of the navigation device 82 is set as the threshold distance. Thus, the second navigation state would indicate that the vehicle 10 is substantially at rest.

Referring to FIG. 1, one of the sensors 49 may include a speed sensor 86 is operatively connected to the controller 20. The speed sensor 86 may be configured to indicate a first speed state when the vehicle 10 is moving above a threshold speed and a second speed state when the vehicle 10 is moving below the threshold speed. In one example, the threshold speed is 3 km/h. The speed sensor 86 may be mounted to an output shaft of the vehicle transmission 94.

Referring to FIG. 1, one of the sensors 49 may include an ignition sensor 88 operatively connected to the controller 20 and to a vehicle ignition 90. The ignition sensor 88 may be configured to indicate a first ignition state when the ignition 90 is on and a second ignition state when the ignition 90 is off.

Referring to FIG. 1, one of the sensors 49 may include a transmission sensor 92 operatively connected to the controller 20 and to a vehicle transmission 94. As is known, the transmission 94 may be in one of several operating states, such as park, reverse, drive, neutral and low. The transmission sensor 92 may be configured to indicate a first transmission state when the transmission 94 is not in park and a second transmission state when the transmission 94 is in park.

Referring to FIG. 1, the controller 20 is adapted to execute a locking module 21 for the door 12. The locking module 21 may be configured to block the first and/or second electronic handle switches 22, 24, thereby preventing the door 12 from being unlatched. Alternatively, the locking module 21 may be configured to block the door lock switch 44 of FIG. 1, thereby preventing the door 12 from being locked or unlocked. As described below, the locking module 21 is enabled when one or more predefined operating parameters are met. The controller 20 disables the locking module 21 when one or more entry conditions are satisfied.

Controller 20 optimizes the function of the locking module 21 in part by executing an algorithm 200 (shown in FIG. 4) which resides within the controller 20 or is otherwise readily executable by the controller 20. Controller 20 may include one or more digital computers or data processing devices, each having one or more microprocessors or memory devices capable of executing the algorithm 200 and other devices connected to the controller 20. The locking module 21 may be operatively connected to the controller 20 or may be embodied in the controller 20. The controller 20 may include various computing components or devices for performing various operations, processing tasks, and functions. Such operations, tasks, and functions are sometimes referred to as being computer-executed, computerized, software-implemented, or computer-implemented. Controller 20 may include various sensors, computing devices and control modules, electronic control units (ECUs), or at least one processor and/or a memory which includes instructions stored thereon (or in another computer-readable medium) for carrying out the processes and methods as described below. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 4:
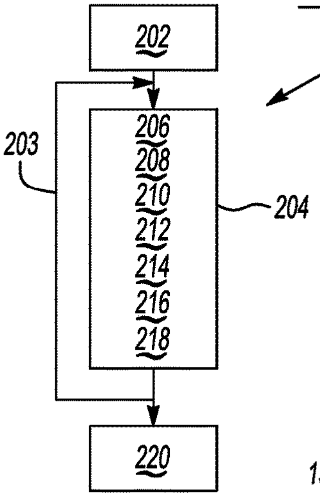
FIG. 4 is a flow chart describing a method for controlling a locking module for the door shown in FIG. 1.

The controller 20 may also include sufficient transitory memory, e.g., random access memory (RAM), so that transient signals, which are not considered storage media herein, may be transmitted, received, and processed as needed in executing the algorithm 200 of FIG. 4. The controller 20, whether configured as a single computer device or a distributed system, may include other components as needed, such as but not limited to high-speed clocks, timers, analog-to-digital (A/D) circuitry, digital-to-analog (D/A) circuitry, digital signal processors, and any necessary input/output (I/O) devices and/or other signal conditioning and/or buffer circuitry.

Referring to FIG. 4, algorithm 200 may begin with step 202, wherein the controller 20 of FIG. 1 determines whether one or more predefined operating parameters are met for enablement of the locking module 21 when the vehicle 10 is started or powered. Referring to FIG. 1, the operating parameter may be that the ignition sensor 88 indicates the first ignition state (that is, when the ignition 90 is on). Another operating parameter may be that the transmission sensor 92 of FIG. 1 indicates the first transmission state (that is, when the transmission 94 is not in park). Another operating parameter may be that the speed sensor 86 of FIG. 1 indicates the first speed state (that is, when the vehicle 10 is moving above a threshold speed).

Referring to FIG. 4, when at least one of the operating parameters is met, algorithm 200 enables the locking module 21 and proceeds to step 204. At step 204, controller 20 determines whether one or more entry conditions are satisfied. FIG. 4 illustrates first through seventh entry conditions 206, 208, 210, 212, 214, 216 and 218 (described below). If any of the entry conditions are satisfied, the algorithm 200 proceeds to step 220. At step 220, controller 20 disables the locking module 21. If none of the entry conditions are satisfied, the algorithm 200 proceeds back to step 202, as indicated by line 203. Any combination of the entry conditions 206, 208, 210, 214, 216 and 218 may be employed for a particular application. In other words, a particular application may include just one or two of the listed entry conditions. In one embodiment, the locking module 21 is disabled when any one of the first through the seventh entry conditions 206, 208, 210, 212, 214, 216 and 218 are satisfied and re-enabled when any one of the first through the seventh entry conditions 206, 208, 210, 212, 214, 216 and 218 are no longer satisfied.

Referring to FIG. 4, the first entry condition 206 is satisfied when the airbag sensor 50 of FIG. 1 indicates a second airbag state (described above). The second entry condition 208 is satisfied when the rollover sensor 54 of FIG. 1 indicates the second roll position (described above). The third entry condition 210 is satisfied when the suspension sensor 66 of FIG. 1 indicates the second suspension state 78 (shown in FIG. 3 and described above). The fourth entry condition 212 is satisfied when the navigation sensor 80 of FIG. 1 indicates the second navigation state. The fifth entry condition 214 is satisfied when the speed sensor 86 of FIG. 1 indicates the second speed state (that is, when the vehicle is moving below the threshold speed). The sixth entry condition 216 is satisfied when the ignition sensor 88 of FIG. 1 indicates the second ignition state (that is, when the ignition 90 is off). The seventh entry condition 218 is satisfied when the transmission sensor 92 of FIG. 1 indicates a second transmission state (that is, when the transmission 94 is in park).

In summary, controller 20 disables the locking module 21 when one or more entry conditions are satisfied. It is within the scope of the present disclosure that the controller 20 employed may eliminate one or more steps or entry conditions or may determine the steps in an order other than as described above.

Referring now to FIG. 5, an exploded view of an example latch assembly 18 is shown. The assembly 18 shown in FIG. 5 is intended as a non-limiting example. Any other type of suitable latch assembly 18 known to those skilled in the art may be employed. The latch assembly 18 includes at least one motor 112. The motor 112 is configured to drive the mechanical operation for a disengaging a fork bolt lever 114 from a striker 116 to provide an open state of the latch assembly 18. Referring to FIG. 1, the controller 20 receives a signal from one of the switches 34, 36, 48 and transmits the signal to the motor 112 (shown in FIG. 5). The motor 112 may be placed in a water resistant enclosure 118.

Referring to FIG. 5, a cam 120 and gear set (having gears 122, 124) is operatively connected to the motor 112. A detent lever 126 is coupled to the motor 112 via the cam 120 and gear set (having gears 122, 124). The detent lever 126 is located in a chamber of plastic housing behind a metal face plate 128. An elongated coil spring 130 is placed in a curved slot in the plastic housing (not shown) behind the fork bolt lever 114, and engages a depending pin (not shown) of the fork bolt lever 114 at one end. The detent lever 126 is biased into engagement with the fork bolt lever 114 by a coil spring 132 that surrounds a bushing 134 that has one end engaging a housing (not shown) and one end engaging an ear of the detent lever 126.

Referring to FIG. 5, the fork bolt lever 114 is configured to engage the detent lever 126 or vice-versa. The striker 116 is configured to engage the fork bolt lever 114. The detent lever 126 engages the fork bolt lever 114 in either an intermediate or a full latched position against the bias of coil spring 132 and the seal force of the door 12. The detent lever 126 continues to hold the fork bolt lever 114 in the intermediate or full latched positions until the motor 12 moves the detent lever 126. When the motor 12 moves the detent lever 126 against the force of the coil spring 130 and the seal force of the door 12, the fork bolt lever 114 is released. The coil spring 130 forces the fork bolt lever 114 back into the unlatched position, allowing the striker 116 to pull out of the fork bolt lever 114.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:

a control system having a controller;

a door having an electronic latch mechanism;

the controller being operatively connected to the door;

an electronic handle switch operatively connected to the controller and configured to control operation of the electronic latch mechanism based at least partially on an activation of the electronic handle switch;

a locking module operatively connected to the controller, the locking module being configured to block the electronic handle switch, thereby preventing the door from being unlatched;

the control system having a navigation device operatively connected to the controller and configured to indicate a first position of the vehicle at a first time and a second position of the vehicle at a second time, the navigation device defining a threshold distance;

at least one sensor operatively connected to the controller, the at least one sensor being configured to indicate one of at least two states, a first vehicle state and a second vehicle state;

wherein the at least one sensor also includes a navigation sensor operatively connected to the controller;

wherein the navigation sensor is configured to determine a moving distance of the vehicle, the moving distance of the vehicle being defined as a difference between the first position and the second position;

wherein the navigation sensor is configured to indicate a first navigation state when the moving distance is greater than the threshold distance in a predefined time and a second navigation state when the moving distance is less than or equal to the threshold distance in the predefined time;

wherein the at least one sensor also includes a rollover sensor operatively connected to the controller and configured to indicate a first roll position when the vehicle is substantially un-rotated and a second roll position when the vehicle has rotated beyond a threshold angle;

wherein the at least one sensor also includes a suspension sensor operatively connected to the controller and configured to indicate a first suspension state when a vertical displacement of a suspension system is below a threshold displacement and a second suspension state when the vertical displacement is above the threshold displacement;

wherein the controller enables the locking module when one or more predefined operating parameters are met;

wherein the controller disables the locking module when at least one entry condition is satisfied;

wherein the controller re-enables the locking module when any one of the at least one entry condition is no longer satisfied;

wherein the at least one entry condition includes the navigation sensor indicating the second navigation state;

wherein the at least one entry condition also includes the rollover sensor indicating the second roll position; and wherein the at least one entry condition also includes the suspension sensor indicating the second suspension state.

2. The vehicle of claim 1, wherein the electronic handle switch is mounted to an interior of the door.

3. The vehicle of claim 1, wherein the electronic handle switch is mounted to an exterior of the door.

4. The vehicle of claim 1, further comprising:

a door lock switch operatively connected to the controller and configured to control operation of the electronic latch mechanism based at least partially on an activation of the door lock switch; and wherein the locking module is configured to block the door lock switch, thereby preventing the door from being locked or unlocked.

5. The vehicle of claim 1, wherein the at least one sensor includes:

a speed sensor operatively connected to the controller, the speed sensor being configured to indicate a first speed state when the vehicle is moving above a threshold speed and a second speed state when the vehicle is moving below the threshold speed; and wherein the at least one entry condition includes the speed sensor indicating the second speed state.

6. The vehicle of claim 1, wherein the threshold speed is 3 km/h.

7. The vehicle of claim 1, wherein the at least one sensor includes:

an ignition sensor operatively connected to the controller and to a vehicle ignition, the ignition sensor being configured to indicate a first ignition state when the ignition is on and a second ignition state when the ignition is off; and wherein the at least one entry condition includes the ignition sensor indicating the second ignition state.

8. The vehicle of claim 1, wherein the at least one sensor includes:

a transmission sensor operatively connected to the controller and to a vehicle transmission, the transmission sensor being configured to indicate a first transmission state when the transmission is not in park and a second transmission state when the transmission is in park; and wherein the at least one entry condition includes the transmission sensor indicating the second transmission state.

9. The vehicle of claim 1, wherein the at least one sensor includes:

a transmission sensor operatively connected to the controller and to a vehicle transmission, the transmission sensor being configured to indicate a first transmission state when the transmission is not in park and a second transmission state when the transmission is in park;

an ignition sensor operatively connected to the controller and to a vehicle ignition, the ignition sensor being configured to indicate a first ignition state when the ignition is on and a second ignition state when the ignition is off;

a speed sensor operatively connected to the controller, the speed sensor being configured to indicate a first speed state when the vehicle is moving above a threshold speed and a second speed state when the vehicle is moving below the threshold speed; and wherein the one or more predefined operating parameters include at least one of the speed sensor indicating the first speed state, the ignition sensor indicating the first ignition state, and the transmission sensor indicating the first transmission state.

10. The vehicle of claim 1, wherein the electronic latching mechanism includes:

a power source; and a latch assembly for the door operatively connected to the power source, the latch assembly including;

a motor;

a cam and gear set operatively connected to the motor;

a detent lever coupled to the cam and gear set;

a fork bolt lever configured to engage the detent lever; and a striker configured to engage the fork bolt lever.

11. A vehicle comprising:

a control system having a controller;

a door having an electronic latch mechanism;

the controller being operatively connected to the door;

an electronic handle switch operatively connected to the controller and configured to control operation of the electronic latch mechanism based at least partially on an activation of the electronic handle switch;

a locking module operatively connected to the controller, the locking module being configured to block the electronic handle switch, thereby preventing the door from being unlatched;

the control system having a navigation device operatively connected to the controller and configured to indicate a first position of the vehicle at a first time and a second position of the vehicle at a second time, the navigation device defining a threshold distance;

at least one sensor operatively connected to the controller, the at least one sensor being configured to indicate one of at least two states, a first vehicle state and a second vehicle state;

wherein the at least one sensor also includes a navigation sensor operatively connected to the controller;

wherein the navigation sensor is configured to determine a moving distance of the vehicle, the moving distance of the vehicle being defined as a difference between the first position and the second position;

wherein the navigation sensor is configured to indicate a first navigation state when the moving distance is greater than a threshold distance in a predefined time and a second navigation state when the moving distance is less than or equal to the threshold distance in the predefined time;

wherein the controller enables the locking module when one or more predefined operating parameters are met;

wherein the controller disables the locking module when each one of a plurality of entry conditions are satisfied;

wherein the controller re-enables the locking module when any one of the plurality of entry conditions is no longer satisfied; and wherein the plurality of entry conditions includes the navigation sensor indicating the second navigation state.

12. The vehicle of claim 11, wherein:

the at least one sensor includes an ignition sensor operatively connected to the controller and to a vehicle ignition, the ignition sensor being configured to indicate a first ignition state when the ignition is on and a second ignition state when the ignition is off; and the plurality of entry conditions includes the ignition sensor indicating the second ignition state.

13. The vehicle of claim 12, wherein:

the at least one sensor includes a rollover sensor operatively connected to the controller and configured to indicate a first roll position when the vehicle is substantially un-rotated and a second roll position when the vehicle has rotated beyond a threshold angle;

the at least one sensor includes a suspension sensor operatively connected to the controller and configured to indicate a first suspension state when a vertical displacement of a suspension system is below a threshold displacement and a second suspension state when the vertical displacement is above the threshold displacement; and the plurality of entry conditions includes the rollover sensor indicating the second roll position and the suspension sensor indicating the second suspension state.

14. The vehicle of claim 11, wherein:

the threshold distance is defined as a margin of error of the navigation device.

15. The vehicle of claim 11, wherein the at least one sensor also includes:

a transmission sensor operatively connected to the controller and to a vehicle transmission, the transmission sensor being configured to indicate a first transmission state when the transmission is not in park and a second transmission state when the transmission is in park;

a speed sensor operatively connected to the controller, the speed sensor being configured to indicate a first speed state when the vehicle is moving above a threshold speed and a second speed state when the vehicle is moving below the threshold speed; and wherein the one or more predefined operating parameters include at least one of the speed sensor indicating the first speed state and the transmission sensor indicating the first transmission state.

* * * * *